United States Patent [19]
Hurst et al.

[11] Patent Number: 6,139,118
[45] Date of Patent: Oct. 31, 2000

[54] ELECTRONIC BRAKING SYSTEM FOR ROAD VEHICLES OPERATING WITH A TRAILER

[75] Inventors: David Charles Hurst, Solihull; Paul Feetenby, Yardley; Malcolm Brearley, Solihull; Denis John McCann, Cricknowell, all of United Kingdom

[73] Assignee: Lucas Industries PLC, West Midlands, United Kingdom

[21] Appl. No.: 09/068,976

[22] PCT Filed: Nov. 22, 1996

[86] PCT No.: PCT/GB96/02888

§ 371 Date: Jun. 5, 1998

§ 102(e) Date: Jun. 5, 1998

[87] PCT Pub. No.: WO97/19843

PCT Pub. Date: Jun. 5, 1997

[30] Foreign Application Priority Data

Nov. 24, 1995 [GB] United Kingdom ................... 9524048

[51] Int. Cl.$^7$ ................................. B60J 8/00; B60J 8/26
[52] U.S. Cl. .......................... 303/7; 188/3 H; 188/112 R
[58] Field of Search .................. 188/3 H, 3 R, 188/112 R; 303/3, 7, 123, 124

[56] References Cited

U.S. PATENT DOCUMENTS

| | | | |
|---|---|---|---|
| 4,553,788 | 11/1985 | Smith | 303/7 |
| 5,002,343 | 3/1991 | Brearley et al. | 303/123 |
| 5,080,445 | 1/1992 | Brearley et al. | 303/7 |
| 5,295,736 | 3/1994 | Brearley | 303/7 |
| 5,403,073 | 4/1995 | Frank et al. | 303/7 |
| 5,588,716 | 12/1996 | Stumpe | 303/7 |
| 5,632,530 | 5/1997 | Brearley | 303/22.1 |

FOREIGN PATENT DOCUMENTS

| | | |
|---|---|---|
| 0 374 484 | 6/1990 | European Pat. Off. . |
| 0 445 575 | 9/1991 | European Pat. Off. . |
| 0 532 863 | 3/1993 | European Pat. Off. . |
| WO91/09758 | 7/1991 | WIPO . |

*Primary Examiner*—Chris Schwartz
*Attorney, Agent, or Firm*—Oblon, Spivak, McClelland, Maier & Neustadt, P.C.

[57] ABSTRACT

An electronic braking system for trailers. A control system is incorporated into the braking equipment of a towing vehicle to provide a trailer braking command signal. This signal is regulated so as to balance the braking between the towing vehicle and the trailer through the assessment of forces in the coupling between the two vehicles. The assessment is made indirectly and is calculated from forces measured in the suspension components of at least two axles of the towing vehicle and the changes occurring therein during braking.

14 Claims, 4 Drawing Sheets

ELECTRONIC BRAKING SYSTEM FOR ROAD VEHICLES OPERATING WITH A TRAILER

BACKGROUND OF THE INVENTION

1. Field of the Invention

The present invention relates to electronic braking systems (EBS) for road vehicles and in particular to said systems intended for vehicles which operate with a trailer.

2. Discussion of the Background

In a towing vehicle and trailer combination, it is conventional practice for the braking requirements of the trailer to be signalled from the driver demand (brake pedal depression) in the towing vehicle/unit via the EBS equipment thereon, by either coded electrical or analogue pneumatic signals.

In the ideal case, this braking signal should be set and controlled in such a way as to achieve a balance in braking between the towing and trailer vehicles so that each contributes fairly to the overall retardation, giving clear improvement in overall brake lining wear on the combination and in the stability of the vehicles during heavy braking.

Because towing vehicles are likely to tow many different trailers having unavoidably different braking characteristics, no fixed braking ratio between the towing vehicle and an assumed laden trailer will be satisfactory in maintaining the sought after balance. Proposals have been made already for a learning or adaptive control system to be installed on the towing vehicle in order to assess the braking condition of the trailer and thereafter modify the braking command signals passed to the trailer on each driver braking demand in such a direction as to achieve the desired balance. Such systems are described in European patents 0370 671, 0385 648 and 0531 077 and have the common requirement of a means of measuring the forces exerted by the trailer, during braking, on the towing-vehicle-mounted coupling. Since such direct measurements require expensive sensors and circuitry if they are to be sufficiently rugged for duty on a range of heavy vehicles, there would be a real benefit in value engineering terms, if a means of indirect but practical assessment of the coupling forces could be provided from alternative lower cost sensors which in such a system could have other control benefits when installed on the towing vehicle and could thereby promote the acceptance of trailer control within the haulage industry and thus make benefits of economy and safety available to the truck operator.

There is known from EP-A- 0374 484 a tractor trailer brake control system where measurements are made of axle load on the tractor and which are used in determining the pressure level provided for the trailer so as to seek to achieve a balanced braking performance. The system disclosed in EP-A- 0374 484 has a trailer braking control system which is regulated so as to achieve balanced braking between the towing vehicle and the trailer utilizing the forces in the suspension components of two axles, the changes occurring therein during braking being reflected in these values.

SUMMARY OF THE INVENTION

In accordance with the present invention, there is provided a trailer braking control system which is to be incorporated into the braking equipment of a towing vehicle for providing a trailer braking command signal which is so regulated as to balance the braking between the towing vehicle and the trailer through the assessment of forces in the coupling between the two vehicles, this assessment being indirect and being calculated from forces measured in the suspension components of at least two axles of the towing vehicle and the changes occurring therein during braking, the assessment of forces in the coupling between the towing vehicle and trailer being characterised in that the horizontal force Fh is assessed indirectly, from changes registered during braking in the suspension forces on said two axles of the towing vehicle, by calculation from:

$$Fh = dFf \cdot kf - dFr \cdot Kr - I \cdot Kh$$

where:

dFf=Front axle load increase during braking;

Kf=Front geometric factor of the towing vehicle;

dFr=Rear axle load increase during braking;

Kr=Rear geometric factor of the towing vehicle;

I=Inertia of the towing vehicle; and

Kh=Centre of Gravity geometric factor of the towing vehicle, and in which, for any particular vehicle, these factors other than dFf and dFr are sensibly constant in operation and for a number of production variants of the vehicle range are programmed into the non-volatile memory of the system controller, and the assessment of the vertical force in the coupling being calculated from suspension forces as:

$$Fv = Fsv + dFf + dFr$$

where:

Fsv=Static long term average vertical force in the coupling, calculated from $Ff + Fr - Mt \cdot g$ and Mt·g is provided as a towing vehicle mass factor as a post-build programmed parameter which is then updated from loads measured whenever the towing vehicle is run with no trailer, Ff=Front axle steady state load, Fr=Rear axle steady state load, and dFf and dFr are as specified hereinbefore.

Advantageously, the regulation of the trailer braking command signal is provided by an adaptive/learning system whereby data relating to coupling force error levels gathered during vehicle braking periods, are accumulated and stored for use in setting trailer braking commands on subsequent brake applications and said data are calculated from coupling force values, assessed in a first measurement of average towing vehicle suspension load signals made just before the commencement of each braking period and in a second measurement of the average of said load signals over a variable period selected during brake application by forming the difference between said first and second calculated measurements.

The trailer braking command level can be made dependent on both the driver braking demand and an adaptive variable which is set to a programmed pre-set level each time a new trailer is coupled to the towing vehicle and progressively adjusted away from this pre-set level based upon the learning process, and this learning process can be suspended on any brake application where the quality of the calculated signal does not achieve a pre-set criterion, the trailer braking command then using the previously reached adaptive variable value.

The acceptance quality criterion is preferably such as to require that:

(a) no ABS operation takes place during the stop;

(b) the pre-stop calculated force samples show less than a pre-set variability;

(c) the in-stop calculated force samples used in the period of the average measurement show less than a separate level of variability; and (d) driver braking demand remains sensibly constant during the period of the average in-stop force assessment.

In one preferred embodiment, said adaptive variable comprises an array of such variables selected by the level of driver braking demand and where the corresponding variable is both selectively utilised during the brake application and updated at the end of said braking period.

The adaptive variables can comprise, for example an array of offset parameters which are added to the trailer braking command when selected by the braking demand, in order to produce the effective trailer braking signal.

In an alternative embodiment the adaptive variables can be a combination of offset parameters and multiplying factors which adjust the rate of increase of trailer braking command level with increasing driver demand and where said adaptive variables are applied singly or in combination, once selected by the level of braking demanded.

The present invention thus provides an indirect method of assessment of the trailer thrust forces which are exerted by a semi-trailer or a centre axle trailer on the towing vehicle during braking without requiring the provision of special load sensing transducers within the trailer coupling. This method makes use of the fact that the horizontal and vertical forces in the trailer coupling are able to be calculated from a knowledge of the geometric parameters associated with the tractive unit and a measurement of the dynamic forces in the suspension components of this vehicle.

BRIEF DESCRIPTION OF THE DRAWINGS

The invention is described further hereinafter, by way of example only, with reference to the accompanying drawings, in which.

DISCUSSION OF THE PREFERRED EMBODIMENTS

It has to be recognised that a typical commercial vehicle used on a wide variety of road surfaces does not represent an ideal platform for the generation of axle load measurements so that the employment of learning/adaptive systems has powerful advantages which mandates their application in such braking systems since they allow the braking distribution to be set at a nominal or reference ratio in much the same manner as is the current practice in conventional pneumatic systems today. However, electronic systems have the ability to gradually adapt the setting away from this starting point which is restarted every time a different trailer is coupled up to the towing vehicle, by the assessment of coupling force errors during brake applications. In systems employing the present invention, these coupling force errors are formed from horizontal and vertical coupling forces derived from selected suspension force measurements taken on the towing vehicle during each brake application in which the signals generated are of sufficient quality to be accepted for furthering this learning process. This means of control recognises that some braking periods will, for a variety of reasons such as repeatedly changing demand, ABS operation or rough road surface conditions, not generate processed signals which will be effective in improving the braking balance.

Figure 1:
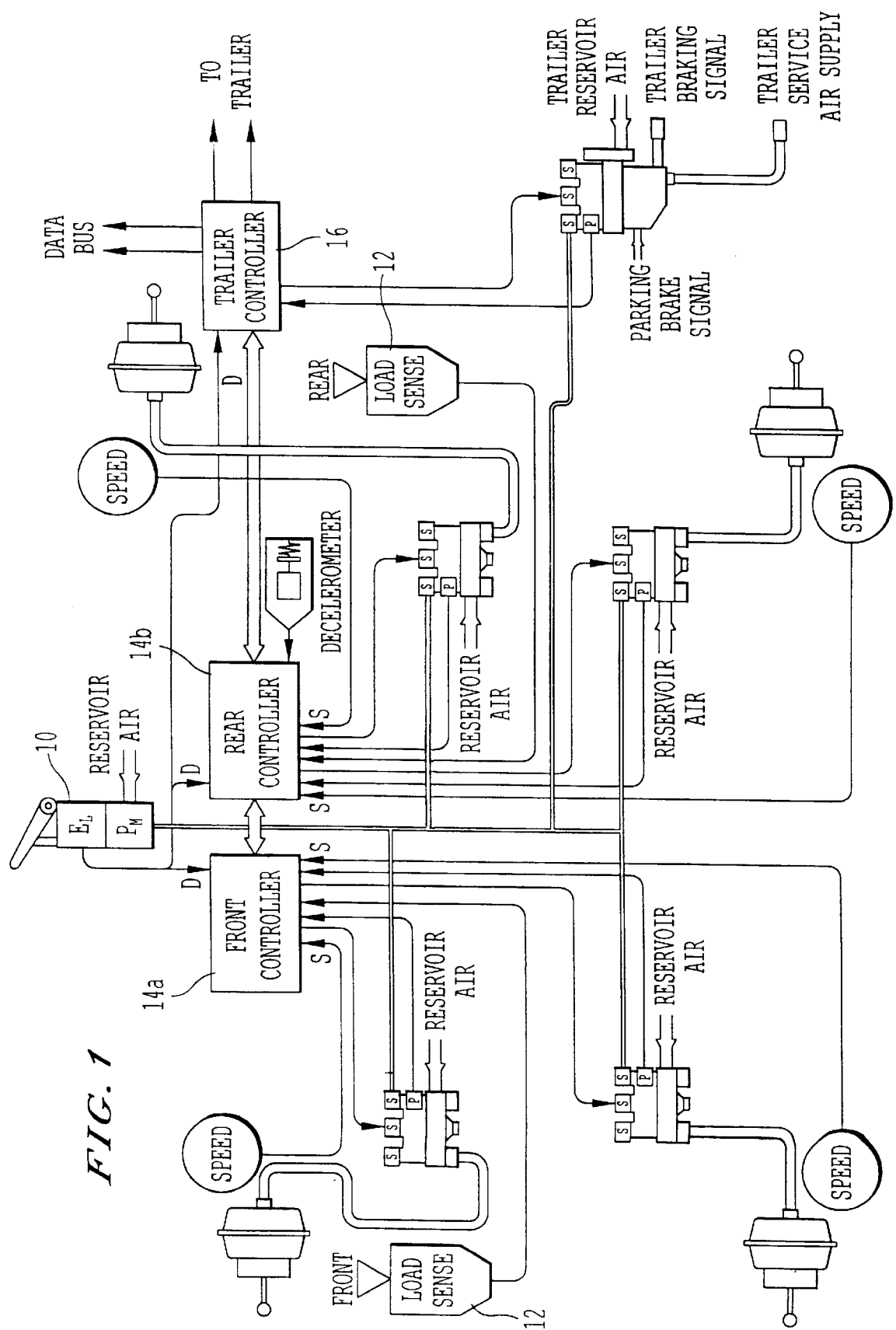
FIG. 1 is a diagram of a typical braking control system in accordance with the present invention which shows the main control elements and signal paths for an EBS with distributed control of the towing vehicle and trailer.

The four channel towing vehicle electronic braking system (EBS) illustrated diagrammatically in FIG. 1 shows individual control of the braking pressures of each wheel of the in this example 2-axle truck or tractor. Thus, four channels of pressure control are provided from a single electrical braking demand signal D generated in braking pedal sensor 10 in response to the driver's foot pressure thereupon. This signal D is modified by axle load inputs generated by sensors 12 associated with the suspension elements or driven by suspension height. Individual pressure control for each wheel is applied by front and rear controllers 14a, 14b in response to these axle pressure demands but will be modified locally from wheel speed signals S in order to provide the ABS function. FIG. 1 also shows a further control channel 16 for setting the pressure signal and/or the coded electrical signal which is passed to the trailer in order to set the braking levels to be applied at the trailer brakes. This signal in either form is produced in response to the same driver braking demand that is communicated to the towing vehicle system and this signal can be connected directly to the trailer braking controller 16 or can be transmitted on a data bus from the towing vehicle controllers or, as a self-checking mechanism, be communicated by both means.

The present invention is concerned primarily with the means of deriving essential signals for controlling the levels of the towing vehicle/trailer braking ratio. The description which follows is based on the assumption of a semi-trailer and tractor towing vehicle and it is generally recognised that, if braking is to be shared fairly between the vehicles in these circumstances then the tractor must supply the braking effort for a significant component of the trailer mass which is being supported by the tractor, with a consequent increases in its axle loads. There will always be a thrust from the trailer during braking and this level of thrust can be shown to be proportional to the braking rate and further dependent on said vertical load being carried by the tractor if the braking duty is being fairly shared by the two halves of the combination.

The control of braking at the trailer in these circumstances is aimed at adjusting the tractor-trailer braking ratio in order to achieve a horizontal force at the level predicted by the vertical load and the deceleration product. This means that the tractor braking level or the trailer braking level is adjusted by thrust error signals. In the preferred embodiment, the trailer braking level is adjusted in the sense that high thrust levels increase trailer braking and low levels reduce trailer braking.

The alternative of adjusting the tractor braking to match that of the trailer, in which case a high thrust would be countered by reducing tractor braking and vice-versa, is obviously an option which may be chosen in cases where the control of the trailer braking signal is not provided and EBS control is provided only on the tractor.

In both system arrangements, the input and feedback signals remain the same and since conventional direct measurement of the force signals exerted by the trailer require expensive sensors to be incorporated into the coupling, there is considerable merit in deriving these forces from measurements of axle loads during braking and pre-braking periods.

However, the employment of axle load signals, whilst giving a useful cost saving, requires the special techniques of utilisation and processing which have been specifically referred to hereinbefore. Other special processing is employed to facilitate the sensing task once the basis of adaptive control has been accepted and all the derived measurements are made in the form of long and medium term averages so as not to be unduly distorted by suspension movements which would seriously compromise the accuracy and reliability of any instantaneous measurements of axle loadings.

The derivation of coupling forces is based on the analysis of tractor axle loads as a result of dynamic operation during braking, once a trailer is being towed.

Figure 2:
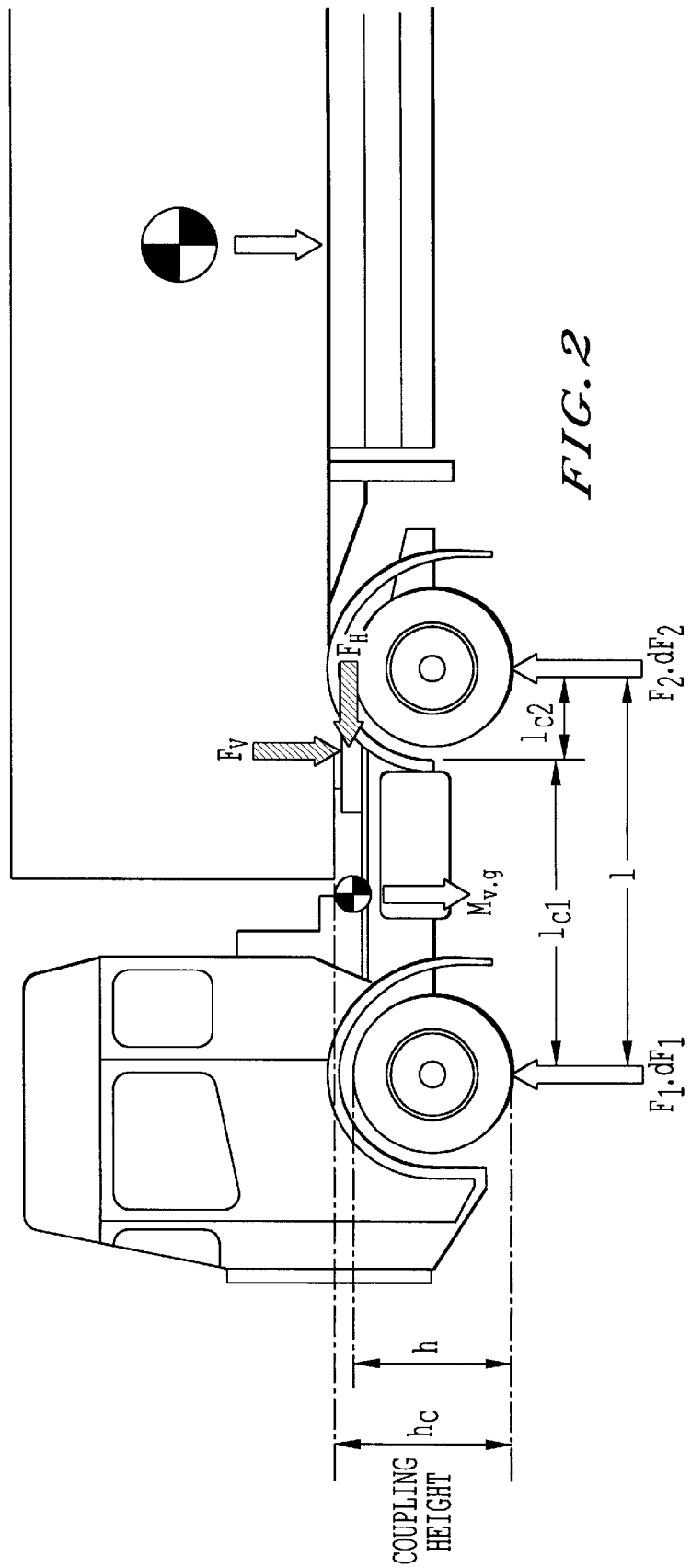
FIG. 2 is a diagram showing the distribution of forces on the towing vehicle, which can be used in determining the forces Fh & Fv in the coupling.

The development of the physical equations governing the distribution of forces on the tractor as shown in FIG. 2 is not set out herein. However the practical conclusions of such an analysis shows the feedback quantity, horizontal force Fh derived through taking moments about a groundpoint under the longitudinal position of the coupling centre as being given by:

$$Fh = f(\text{Front axle moment increase} - \text{Rear axle moment increase} - \text{Inertia moment})$$

This generates the relationship:

$$Fh = (\text{Front load increase} \cdot Kf - \text{Rear load increases} \cdot Kr - \text{Inertia} \cdot Kh)$$

where:

| Kf front axle geometric factor | Lc1/hc |
| Kr rear axle geometric factor | Lc2/hc |
| Kh c of G height factor | H/hc | and these factors Kf & Kr are constants relating to the construction of the tractor and are programmed into the system in the post-build finalisation phase. H is a centre of gravity height which again is programmed in the same phase and is sensibly constant for a given tractor. For a truck, this parameter is recognised as being more complex, comprising a base value+a component proportional to truck load. The vertical force Fv from similar considerations is given as:

$$Fv = Fsv + dFf + dFr$$

where:
dFf & dFr are increases in front and rear axle loads which occur during braking, and
Fsv is the steady state long term average vertical force in the coupling calculated from:

$$Ff + Fr - Mt \cdot g$$

where:
Mt is the tractor Mass.
Ff & Fr are steady state average axle loads.
Mt is a post-build programmed parameter which remains sensibly constant during operation for a given tractor and Mt is checked at each occasion where it is operated without a trailer coupled up, by measuring the axle loads Ff&Fr as averages under static or running conditions.

This process is designed to generate vertical signals which have a base programmed value, but wherein updating readings are taken from actual measurements under tractor-only conditions so that any gradual settling of the suspension will be taken into account by gradual updating of the base measurement each time the trailer is uncoupled or changed. In this way, the actual measurement required becomes a change of load reading registered when the trailer is coupled and possibly thereafter loaded, as opposed to an absolute measurement. Thus there are four components of this vertical measurement, with 1 replacing 0 as data becomes available:

0 Base weight of tractor axles—programmed parameters.
1 Base weight of tractor axles—measured alternative to 0.
2 Load total with trailer (& Load) coupled.
3 Loads measured under braking.
2&3 are steady state average values taken over many readings.
Result of 2—1 is the general steady state Fsv
Result of 3—1 is the required measured Fv under braking.

The quality of suspension signals does not encourage the use of direct closed loop control of trailer braking because noise signals and the initial transient on braking may cause serious swings in trailer braking levels which could cause unacceptable disturbance to vehicle braking such as to threaten stability of the overall train. In a preferred adaptive system, the open loop level of trailer braking is applied and this has the benefit of including any adaptive correction already learned by the system. The thrust transient resulting from the lag in trailer braking compared with that of the tractor is arranged to be ignored by a blanking pulse which causes the acquisition of this erroneous data to be suppressed for a pre-set period of time, dependent upon the level of trailer braking pressure being commanded.

Calculation of the coupling forces is made on a continuous basis but the results are ignored until the blanking pulse ends. The derived horizontal and vertical forces in the coupling are linked with the corresponding deceleration figures being measured repeatedly and used to compute the set point for trailer thrust and thereby also to derive thrust error signals for accumulation throughout a selected part of the braking phase. This process is repeated many times during the braking phase and the accumulated data is averaged during the acquisition period which excludes the initial transient duration and data produced at very low speeds.

The aim of this procedure is to produce a considered average thrust error value for the braking period which can then be used subsequently for correcting the coupling loadings by adjusting the level of trailer braking or depending upon the deceleration achieved by the vehicle, the level of towing vehicle braking as described earlier in our EP 0 370 671.

During the data processing task described above, which is undertaken repeatedly during the selected part of each brake application, additional comparative processing of the data elements accepted over a series of readings is performed in order to check the acceptability of the source signals, the driver demand, deceleration signals and the axle load measurements and a test is made repeatedly on status of the ABS control section in order to detect any ABS action. If these tests reveal unacceptable levels of signal variation or any ABS intervention, the calculated data is ignored and no corrective action components are accumulated if any of the following conditions are found:

(a) the driver braking demand fluctuates substantially;
(b) the deceleration signal shows noise signals greater than a pre-set threshold; or
(c) the axle load signals or the coupling force signals derived therefrom show noise and fluctuation components which are greater than a predetermined threshold.

In an alternative version of the checking software, the error signal itself is checked for variations caused by noise or disturbance in any of the component values used in its derivation and should such variations exceed a pre-set level, these readings are excluded from the error accumulation process.

If the majority of the braking phase turns out to be affected by serious noise or disturbance or by ABS action, then the whole of the braking phase data is excluded and the system rejects this brake application as one in which there is no reliable contribution to the learning process by which the tractor/trailer braking ratio will be controlled.

The result of the process described above is the production of selected data sets comprising demand (or deceleration) level with an associated thrust error or demand correction level and these are stored in an array which is built up from an all zero base, each time a new trailer is linked up to the tractor. These data sets are arranged and stored against the demand (or deceleration) values and the learning process thereby builds up a graph of the relative tractor/trailer braking performance as suggested in our EP 0 531 077.

The simplest system of correction has values stored as additional demand levels which are to be added algebraically to the pressure demands generated in response to the driver braking inputs. These correction values can be positive or negative depending upon the relative values of set point and derived coupling thrust.

Figure 3:
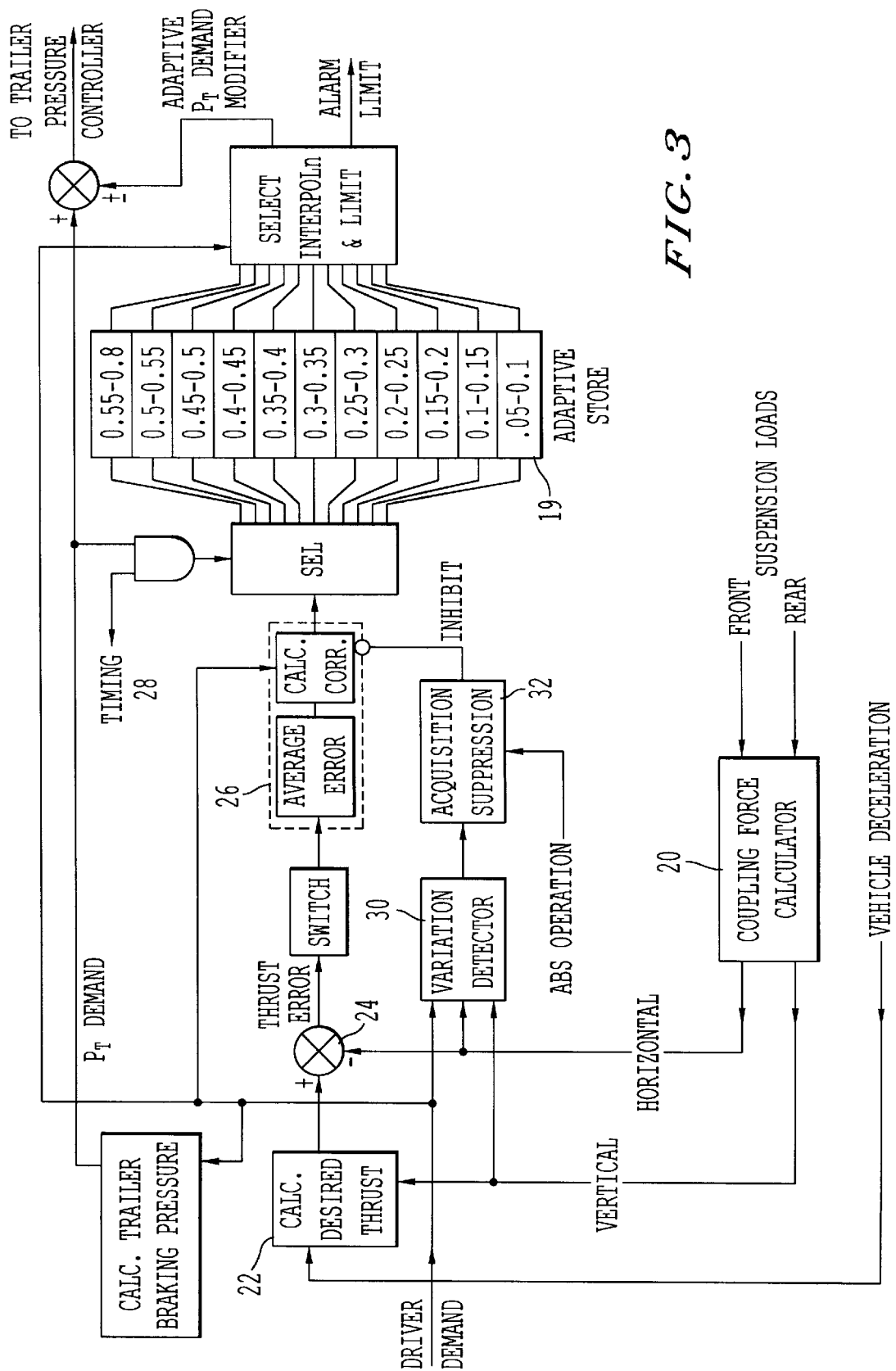
FIG. 3 is a schematic diagram of one example of an adaptive system for a trailer control system using practical signals generated in the tractor suspension to derive feedback signals.

These parameters are stored in an array 19 such as shown in FIG. 3 and when each demand is detected, the appropriate correction figure is selected and used to adjust the braking pressure level being sent to the trailer. At the end of the braking phase, if a new correction figure is derived, this is used to directly adjust the correction parameter which was used in the braking phase and as a means of developing the array as quickly as possible after each new trailer is linked up, other elements in the array are indirectly and tentatively adjusted in proportion to the position of the element in the demand array and the amount of correction being made in that actual element which is being addressed directly.

Figure 4:
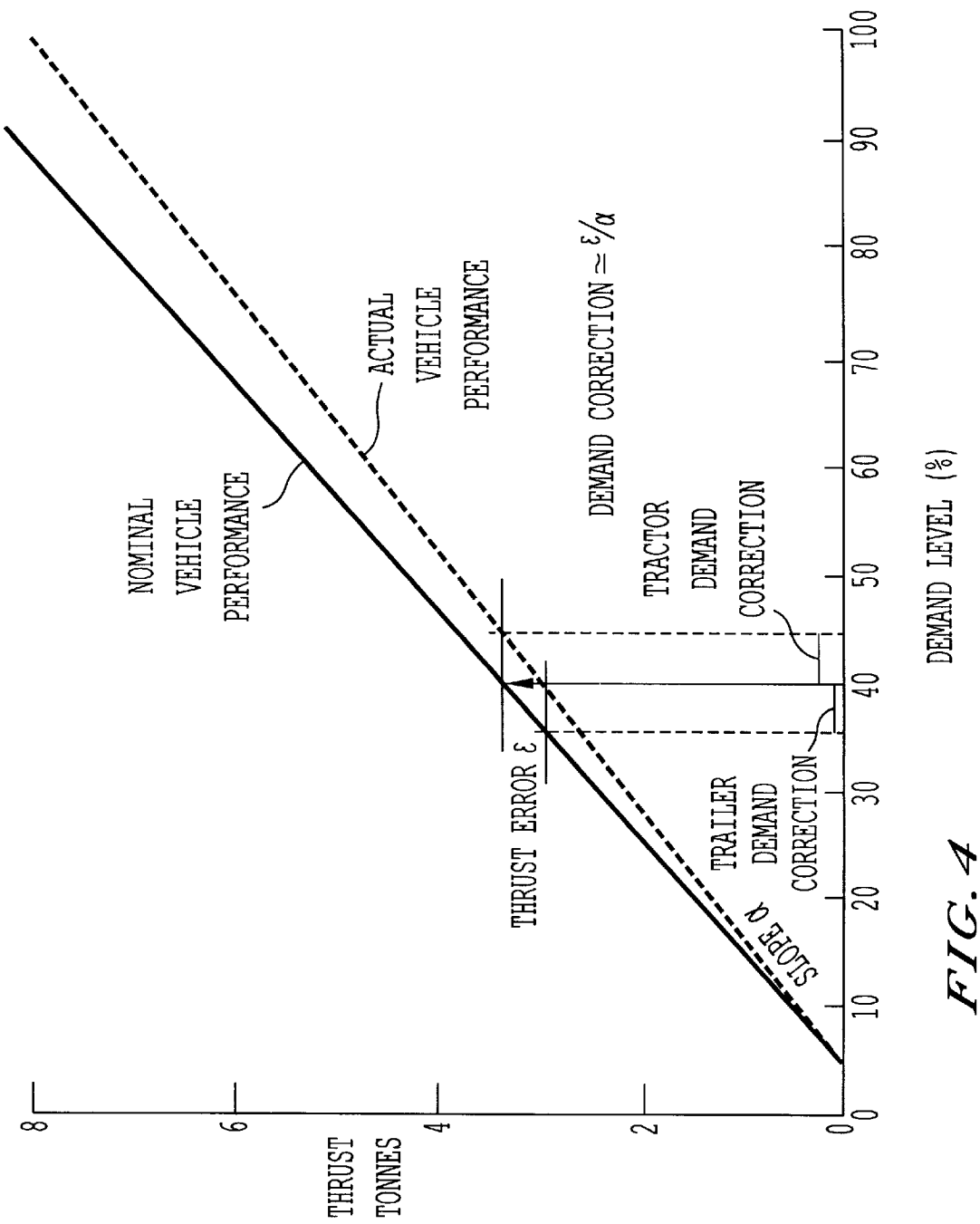
FIG. 4 is a graph showing the conversion from thrust error to demand correction.

In another system of correction, only two parameters are stored in order to make the corrections throughout the demand range on the assumption of linear braking characteristics. These consist of firstly an offset which is effective to adjust the level of braking threshold by adding a learned value of offset to all subsequent demands and secondly a slope correction which causes increasing additional corrections to be made as demand for braking is increased. This correction regime is supported by the same data pairs of average error against demand/deceleration, from which the corresponding correction against demand level can easily be calculated as shown in FIG. 4. This shows operation at a 40% demand level and that at the actual vertical load being carried, the Nominal Vehicle Performance predicts the correct thrust. The expected level is not achieved and in the simplest control strategy, the demand signal is adjusted by the addition of a correction which, as shown in FIG. 4, can be added to the tractor demand or subtracted from the trailer demand in the case shown.

The more comprehensive strategy as taught in our EP 0 385 648, would cause the deceleration of the overall vehicle combination to be taken into account before a decision is taken as to where the demand correction is to be made. In the case cited, deceleration higher than that demanded would result in the braking demand to the trailer being reduced, whilst low deceleration would result in tractor demand being increased.

FIG. 3 shows the detail of one possible adaptive control system, with the store of correction adjustments arranged on a base of driver demand being the key input variable, which sets the trailer braking pressure from typical stored parameters. The coupling forces in the horizontal and vertical senses are derived in an element 20 and vertical force and deceleration are used to calculate the desired thrust figure at 22. This is compared with the derived horizontal force and a thrust error is formed at 24 which will be averaged at 26 through a suitable section of the braking period as selected by the system timing 28 so as to ignore the initial thrust transient and low speed operation. The average error is used to calculate the required correction to be made in the pressure demand, shown in this Fig. as the trailer pressure demand. However, as stated above, this could be modified in other control system embodiments.

A variation detector 30 examines the force signals and the demand in order to provide a signal if any one of these is unreasonably disturbed or noisy. An acquisition suppression signal is generated at 32 should the noise limits be exceeded or should ABS come into play and an inhibit is imposed on the error averaging and correction calculation, thereby preventing any updating of the adaptive array 19 on this brake application.

On the other hand, a braking period in which the signals are satisfactory generates a good average error and therefrom a calculated correction which, at the end of the stop, is used to update the addressed store location 19 and the neighbouring locations depending on the actual update strategy.

The system therefore has the capacity to learn the condition of braking on the vehicles and automatically adjust the braking signals so as to give balanced braking between the two. The adaptive section is preferably organised to create a driver warning signal if excessive correction is required on either vehicle.

By virtue of the present invention therefore there is provided a practical means of assessing indirectly, the forces exerted during braking on the towing vehicle, by measurement of loading or changes in loading in the suspension components which are attributable to these braking forces.

What is claimed is:

1. A trailer braking control system incorporated into braking equipment of a towing vehicle for providing a trailer braking command signal when a trailer is towed by the towing vehicle, the trailer braking control system comprising:

a force calculator which assesses a horizontal force Fh and a vertical force Fv indirectly from forces measured in suspension components of at least two axles of the towing vehicle and from changes occurring in the forces during braking, wherein the horizontal force Fh is calculated according to:

$$Fh = dFf \cdot kf - dFr \cdot Kr - I \cdot Kh$$

where:
dFf=Front axle load increase during braking,
Kf=Front geometric factor of the towing vehicle, dFr=Rear axle load increase during braking, Kr=Rear geometric factor of the towing vehicle, I=Inertia of the towing vehicle, and Kh=Center of Gravity geometric factor of the towing vehicle, and Kf, Kr, I, and Kh being predetermined and substantially constant for operation of a given towing vehicle, and wherein the vertical force Fv is calculated according to:

$$Fv = Fsv + dFf + dFr$$

where:

Fsv—Static long term average vertical force in the coupling, $$Fsv = Ff + Fr - Mt \cdot g$$

where:

Mt·g equals the towing vehicle mass factor as a post-build programmed parameter, updated from loads measured whenever the towing vehicle is run with no trailer, Ff=Front axle steady state load, and Fr=Rear axle steady state load; and a regulator, coupled to the force calculator, which regulates the trailer braking command signal based on the assessed horizontal force Fh and the assessed vertical force Fv in a coupling between the towing vehicle and the trailer in order to balance braking between the towing vehicle and the trailer.

2. A trailer braking control system as claimed in claim 1, wherein the regulator comprises:

an adaptive/learning system configured to regulate the trailer braking command signal, including, a calculator which calculates a desired force based on the vertical force assessed in the coupling and the towing vehicle deceleration a calculator which calculates a coupling force error level as the difference between the horizontal force assessed in the coupling and the desired force, a calculator which calculates data as the difference between the coupling force error level assessed in first and second measurements, wherein the first measurement is an assessment of average towing vehicle suspension load signals made just before commencement of a brake application and the second measurement is an assessment of average towing vehicle suspension load signals over a variable period selected during the brake application, and an accumulator which accumulates and stores the data relating to the coupling force error level calculated during the brake application in order to set the trailer braking command signal on subsequent brake applications.

3. A trailer braking control system as claimed in claim 1, wherein the trailer braking command signal is made dependent on both a driver braking demand and an adjustable adaptive factor generated by the adaptive/learning system, which sets the adjustable adaptive factor to a programmed pre-set level each time a new trailer is coupled to the towing vehicle and progressively adjusts the adjustable adaptive factor away from this pre-set level based upon a learning process, and wherein this learning process is suspended on any brake application where the quality of the data does not achieve a pre-set criteria, the trailer braking command signal then using a previously reached value of the adjustable adaptive factor.

4. A trailer braking control system as claimed in claim 3, further comprising:

a sensor which detects whether ABS operation takes place during the braking application;

a detector which detects, (1) whether values of the horizontal and vertical forces in the coupling, calculated before the braking application, show less than a pre-set first variability, (2) whether values of the horizontal and vertical forces in the coupling, calculated during the braking application and used in a period of measurement, show less than a second variability, and (3) whether the driver braking demand remains substantially constant during the period of measurement during the braking application; and a signal generator which generates a suppression signal to inhibit an update to the adjustable adaptive factors if the quality of the pre-set criteria is not achieved, wherein the sensor detects ABS operation or the detector detects values of the horizontal and vertical forces before braking greater than the first variability, values of the horizontal and vertical forces during braking greater than the second variability, or the braking demand that is not substantially constant.

5. A trailer braking system as claimed in claim 3, wherein the adjustable adaptive factor, contained in an array of adjustable adaptive factor, is selected in accordance with the driver braking demand and where a corresponding adjustable adaptive factor is both selectively utilized during the brake application and updated at the end of the braking application.

6. A trailer braking control system as claimed in claim 5, wherein the adjustable adaptive factors in the array comprise respective offset parameters which are added to the trailer braking command signal when selected in accordance with the braking demand, in order to adjust the trailer braking command signal.

7. A trailer braking system as claimed in claim 5, wherein the adjustable adaptive factors in the array comprise respective combinations of offset parameters and multiplying factors which adjust the rate of increase of the trailer braking command signal with increasing driver braking demand.

8. A trailer braking control system as claimed in claim 2, wherein the trailer braking command signal is made dependent on both the driver braking demand and the adjustable adaptive factor generated by the adaptive/learning system, which sets the adjustable adaptive factor to a programmed pre-set level each time a new trailer is coupled to the towing vehicle and progressively adjusts the adjustable adaptive factor away from this pre-set level based upon the learning process, and wherein the learning process is suspended on any brake application where the quality of the data does not achieve the pre-set criteria, the trailer braking command signal then using the previously reached value of the adjustable adaptive factor.

9. A trailer braking system as claimed in claim 4, wherein the adjustable adaptive factor, contained in an array of adjustable adaptive factors, is selected in accordance with the driver braking demand and where a corresponding adjustable adaptive factor is both selectively utilized during the brake application and updated at the end of the braking application.

10. A trailer braking control system as claimed in claim 3, comprising a learning device configured to implement the learning process including an updating mechanism which updates the array of adjustable adaptive factors at the end of the braking application based on the error levels generated during the braking application.

11. A trailer braking control system as claimed in claim 8, comprising a learning device configured to implement the learning process including an updating mechanism which updates the array of adjustable adaptive factors at the end of the braking application based on the error levels generated during the braking application.

12. A trailer braking control system as claimed in claim 8, further comprising:

a sensor which detects whether ABS operation takes place during the braking application;

a detector which detects,
  (1) whether values of the horizontal and vertical forces in the coupling, calculated before the braking application, show less than the pre-set first variability,
  (2) whether values of the horizontal and vertical forces in the coupling, calculated during the braking application and used in the period of measurement, show less than the second variability, and
  (3) whether the driver braking demand remains substantially constant during the period of measurement during the braking application; and a signal generator which generates a suppression signal to inhibit an update to the adjustable adaptive factors if the quality of the pre-set criteria is not achieved, wherein the sensor detects ABS operation or the detector detects values of the horizontal and vertical forces before braking greater than the first variability, values of the horizontal and vertical forces during braking greater than the second variability, or the braking demand that is not substantially constant.

13. A trailer braking control system as claimed in claim 9, wherein the adjustable adaptive factors in the array comprise respective offset parameters which are added to the trailer braking command signal when selected in accordance with the braking demand, in order to adjust the trailer braking command signal.

14. A trailer braking control system as claimed in claim 9, wherein the adjustable adaptive factors in the array comprise respective combinations of offset parameters and multiplying factors which adjust the rate of increase of the trailer braking command signal with increasing driver braking demand.

* * * * *